United States Patent
Zhang et al.

(10) Patent No.: US 12,079,898 B2
(45) Date of Patent: Sep. 3, 2024

(54) METHOD, COMPUTING DEVICE AND COMPUTER READABLE STORAGE MEDIUM FOR COMPUTING

(71) Applicant: Shanghai Biren Technology Co., Ltd, Shanghai (CN)

(72) Inventors: YuFei Zhang, Shanghai (CN); Zhou Hong, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 85 days.

(21) Appl. No.: 17/691,134

(22) Filed: Mar. 10, 2022

(65) Prior Publication Data
US 2022/0295080 A1 Sep. 15, 2022

(30) Foreign Application Priority Data

Mar. 12, 2021 (CN) .......................... 202110267725.7

(51) Int. Cl.
*G06T 1/60* (2006.01)
*G06N 3/04* (2023.01)
*H04N 19/117* (2014.01)
*H04N 19/176* (2014.01)
*H04N 19/61* (2014.01)

(52) U.S. Cl.
CPC ................. *G06T 1/60* (2013.01); *G06N 3/04* (2013.01); *H04N 19/117* (2014.11); *H04N 19/61* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 5,224,210 A | * | 6/1993 | Pinedo | G09G 5/14 345/506 |
| 5,287,487 A | * | 2/1994 | Priem | G06F 12/0862 711/204 |

(Continued)

FOREIGN PATENT DOCUMENTS

| | | | | |
|---|---|---|---|---|
| JP | 2009230615 A | * | 10/2009 | |
| WO | WO-2021108800 A1 | * | 6/2021 | G06N 3/04 |

OTHER PUBLICATIONS

Mukherjee et al., "High Performance VLSI Architecture for Three-Step Search Algorithm" (Year: 2014).*

*Primary Examiner* — Mohammed Jebari
(74) *Attorney, Agent, or Firm* — JCIP GLOBAL INC.

(57) ABSTRACT

The present disclosure relates to a method for computing, computing device and computer-readable storage medium. The method includes: determining a pixel block set in a cache, a first pixel block in the pixel block set comprising an m×n pixel matrix having a first padding setting related to the original pixel data, the m and n being positive integers; and storing the determined pixel block set in a buffer to enable a second pixel block to be read from the buffer based on the buffer initial address of the first pixel block and an address offset associated with the second pixel block, wherein the second pixel block has a second padding setting related to the original pixel data, and the first padding setting and the second padding setting have the same offset amount in a first direction relative to the original pixel data.

12 Claims, 6 Drawing Sheets

(56) References Cited

U.S. PATENT DOCUMENTS

| | | | | |
|---|---|---|---|---|
| 6,011,565 | A * | 1/2000 | Kuo | G06F 12/0875 |
| | | | | 345/531 |
| 2010/0060933 | A1* | 3/2010 | Ogura | H04N 1/0473 |
| | | | | 358/1.16 |
| 2019/0197656 | A1* | 6/2019 | Yoda | G06F 9/3001 |
| 2020/0184595 | A1* | 6/2020 | Hoogeboom | G06N 3/047 |
| 2021/0224630 | A1* | 7/2021 | Sudhir | G06F 7/57 |

\* cited by examiner

METHOD, COMPUTING DEVICE AND COMPUTER READABLE STORAGE MEDIUM FOR COMPUTING

CROSS-REFERENCE TO RELATED APPLICATION

This application claims the priority benefit of China application serial no. 202110267725.7, filed on Mar. 12, 2021. The entirety of the above-mentioned patent application is hereby incorporated by reference herein and made a part of this specification.

BACKGROUND

Technical Field

Embodiments of the present disclosure generally relate to the technical field of artificial intelligence (AI), and more specifically, to a method, computing device and computer readable storage medium for computing.

Description of Related Art

Padding pixel data is often performed in AI-based image processing or convolutional neural networks. For example, in a convolutional neural network, a convolution computation covers multiplying weights in the convolution kernel by respective input pixel blocks and then adding the respective results to generate a value of an output feature. However, when performing the convolution computation, pixels around the image are often missing, resulting in pixel loss. Especially when multiple consecutive convolutional layers are applied, if each layer has pixel loss due to missing pixels around the image, there will be a great image pixel loss accumulated in the end.

Therefore, before convolution, extra pixels are typically added around the boundary of the input original image, i.e., paddings are performed for the original image. The padded pixel data are then convoluted to avoid loss of pixel information by increasing the effective size of the image. In weight gradient calculation in back propagation, various combinations of, for example, horizontal paddings and vertical paddings, are typically required to obtain padded pixel data.

SUMMARY

The present disclosure provides a method for computing, computing device and computer readable storage medium, which can provide a cache implementation for convolution computation.

According to a first aspect of the present disclosure, there is provided a method for computing. The method includes: determining a pixel block set in a cache, a first pixel block in the pixel block set comprising an m×n pixel matrix having a first padding setting related to the original pixel data, the m and n being positive integers; and storing the pixel block set in a buffer to enable a second pixel block to be read from the buffer based on the buffer initial address of the first pixel block and an address offset associated with the second pixel block, wherein the second pixel block has a second padding setting related to the original pixel data, and the first padding setting and the second padding setting have the same offset amount in a first direction relative to the original pixel data.

According to a second aspect of the present disclosure, there is provided a computing device, comprising: at least one processing unit; and at least one memory coupled to the at least one processing unit and storing instructions executed by the at least one processing unit, the instructions causing, when executed by the at least one processing unit, the computing device to perform the method according to the first aspect of the present disclosure.

According to a third aspect of the present disclosure, there is also provided a computer readable storage medium. The computer readable storage medium has computer instructions stored thereon, which are used to cause a machine to perform the method according to the first aspect of the present disclosure.

In some embodiments, pixel data in a line from the m lines or pixel data in a column from the n columns occupy an entry of the buffer, and the entry has a corresponding buffer address.

In some embodiments, the pixel block set comprises 2 pixel blocks, and each pixel block comprises an 8×8 pixel matrix.

In some embodiments, the first direction is a horizontal direction or vertical direction.

In some embodiments, the first padding setting is different than the second padding setting.

In some embodiments, when a filter size is 3×3 the original pixel data have 9 different padding settings including the first padding setting and the second padding setting.

In some embodiments, the original pixel data have multiple different padding settings, and reading the second pixel block from the buffer comprises: reading a plurality of second pixel blocks from the buffer, the plurality of second pixel blocks having respective padding settings, the respective padding settings having the same offset amount in the first direction relative to the original pixel data.

In some embodiments, the method further comprises determining, based on a filter size related to the original pixel data, the first padding setting.

It would be appreciated that this Summary is not intended to identify key features or essential features of the example embodiments of the present disclosure, nor is it intended to be used to limit the scope of the disclosure. Other features of the present disclosure will be made apparent by the following description.

BRIEF DESCRIPTION OF THE DRAWINGS

Drawings are provided for better understanding on the solution, which do not constitute any limitation to the present disclosure.

Throughout the drawings, the same or similar reference symbols refer to the same or similar elements.

DESCRIPTION OF THE EMBODIMENTS

Example embodiments of the present disclosure will be described with reference to the accompanying drawings, where various details of the embodiments of the present disclosure will be presented to facilitate understanding, which should, however, be considered as examples. Those skilled in the art should realize that, without departing from the scope and spirit of the present disclosure, various changes and modification to the embodiments described here are allowed. In addition, for clarity and brevity, description on common functionalities and structures will be omitted here.

In the description on the embodiments of the present disclosure, the term "includes" and its variants are to be read as open-ended terms that mean "includes, but is not limited to." The term "based on" is to be read as "based at least in part on." The term "an embodiment" and "the embodiment" are to be read as "at least one embodiment." The terms "first," "second," and the like may refer to different or the same objects. Other definitions, either explicit or implicit, may be included below.

As aforementioned, prior to convolution, padding is typically performed on the original image. Hereinafter, two padding methods will be described respectively.

Figure 1:
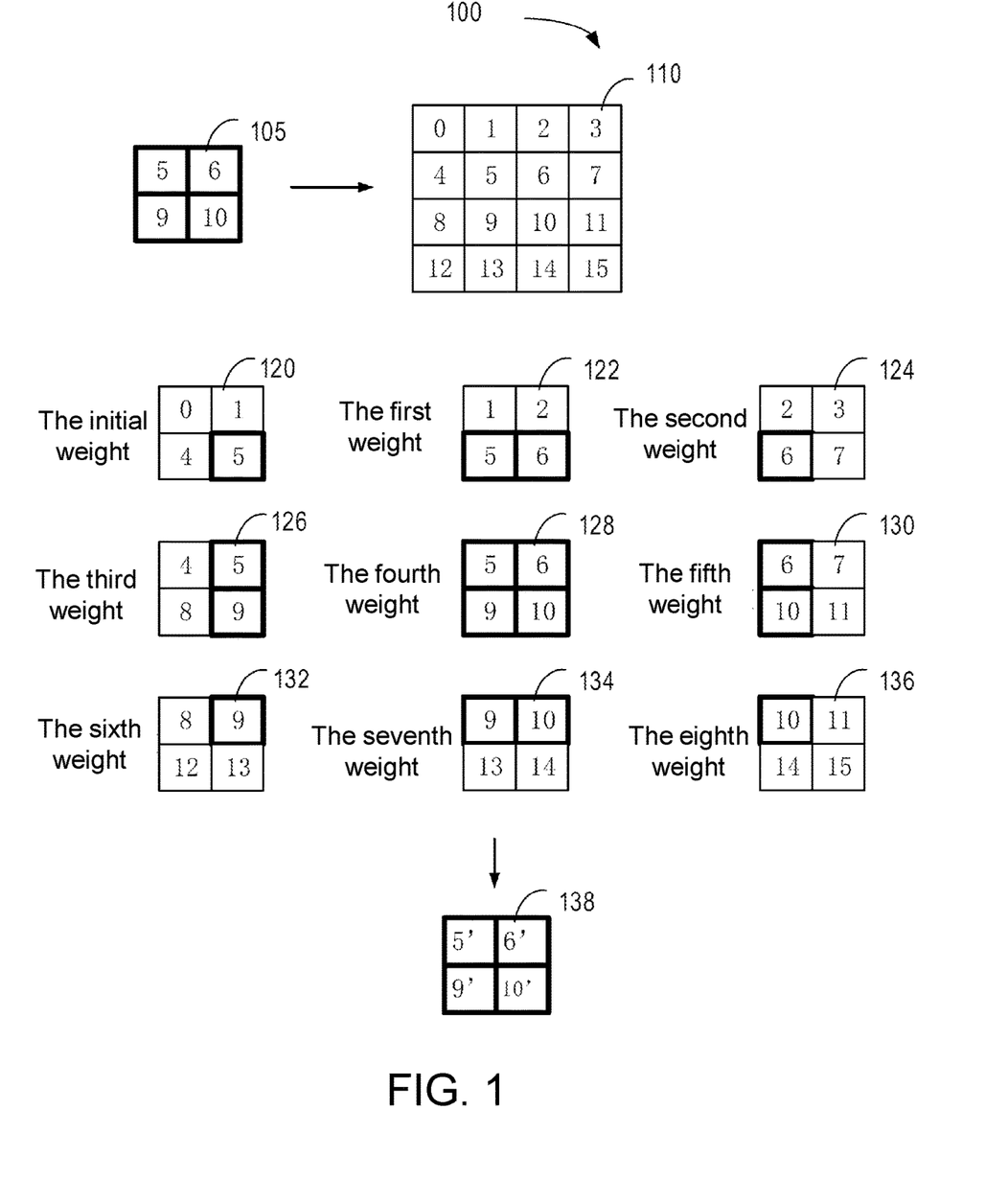
FIG. 1 illustrates a schematic diagram of a traditional method for convolution computation.

In an example, extra pixels may be added around the boundary of the input original image to pad the original image. Reference now will be made to FIG. 1 to describe a traditional method for convolution computation. FIG. 1 illustrates a schematic diagram of a traditional method 100 for convolution computation.

As shown in FIG. 1, before convoluted, an original image 105 (or referred to as original pixel data) having a 2×2 pixel is first padded, where the original image 105 is comprised of pixels 5, 6, 9 and 10. In an example, as viewed from the image, each of the pixels 5, 6, 9 and 10 may include information on three colors, namely red, green and blue (RGB). In another example, an article is taken as an example. For instance, if the article is a lipstick, each pixel may include information on color, model, appearance, and the like, of the lipstick. In other words, each pixel may have a plurality of (e.g., 3, several hundred or thousand) features.

In the example as shown in FIG. 1, by padding the outside of the original image 105 with a circle of pixels (including pixels 0, 1, 2, 3, 4, 7, 8, 11, 12, 13, 14 and 15), a padded image 110 with a 4×4 pixel is obtained.

Thereafter, the padded image 110 may be filtered. For example, a filter with a size (i.e. a size of a convolution kernel) of 3×3 (not shown) is utilized for convolution computation. When filtering is performed, the padded image 110 with the 4×4 pixel is divided into nine 2×2 pixels, as shown in FIG. 1. In addition, each 2×2 pixel has a corresponding weight (e.g., from weight 0 to weight 8) for convolution computation, and an output image 138 with a 2×2 pixel (e.g., including 5', 6', 9' and 10') is obtained accordingly.

More specifically, for example, a 3×3 convolution kernel (not shown) computation is performed on the padded image 110 with the 4×4 pixel, where the 3×3 convolution kernel includes 9 weights, namely an initial weight (weight 0) to an eighth weight (weight 8). In the case, as shown in FIG. 1, each pixel in the 2×2 pixels 120 has the initial weight; each pixel in the 2×2 pixels 122 has the first weight; each pixel in the 2×2 pixels 124 has the second weight; each pixel in the 2×2 pixels 126 has the third weight; each pixel in the 2×2 pixels 128 has the fourth weight; each pixel in the 2×2 pixels 130 has the fifth weight; each pixel in the 2×2 pixels 132 has the sixth weight; each pixel in the 2×2 pixels 134 has the seventh weight; each pixel in the 2×2 pixels 136 has the eighth weight. It would be appreciated that, when processing an original image (or original pixel data), it is required to load 2×2 pixel data (or referred to as 2×2 pixel matrix) corresponding to each weight from the cache to the buffer for convolution computation.

Figure 2:
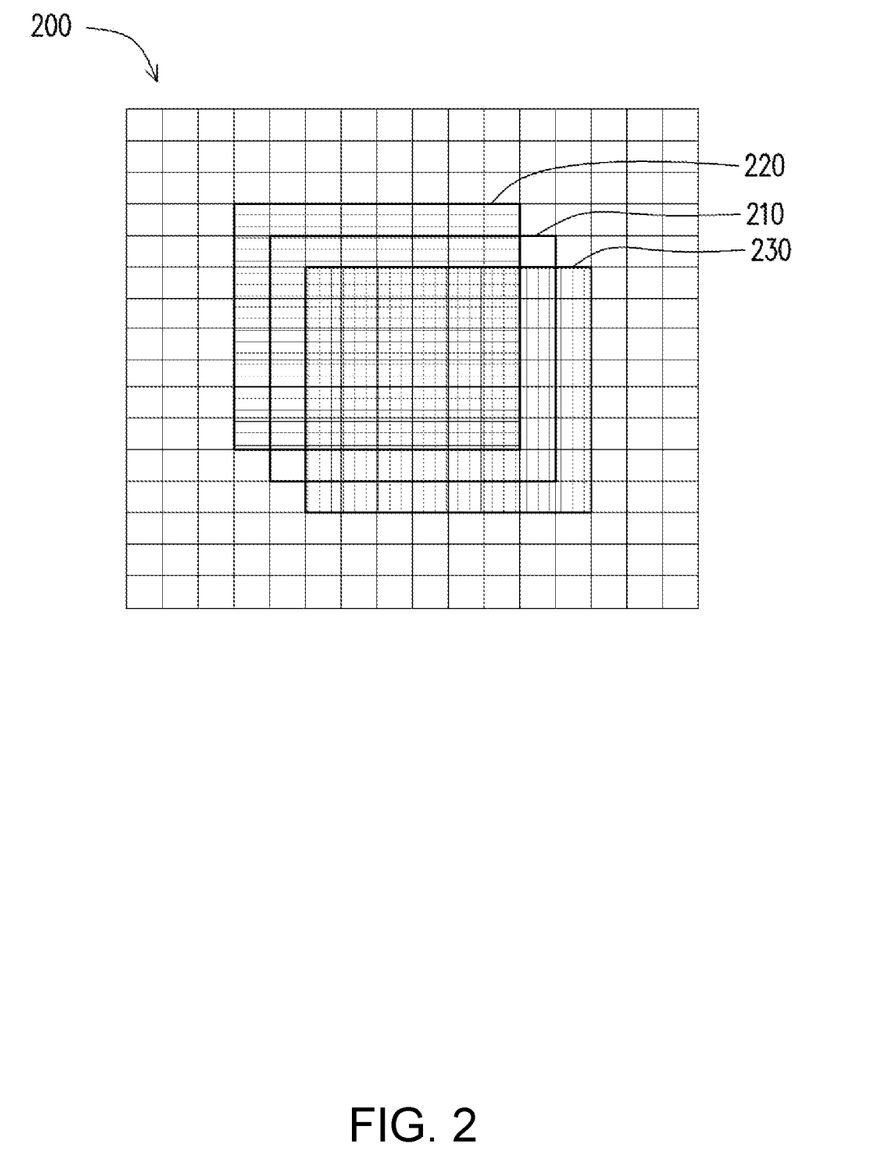
FIG. 2 illustrates a schematic diagram of a traditional pixel block with different padding settings.

In another example, during weight gradient calculation in back propagation, it is also required to load pixel data corresponding to 9 weights of, for example, a 2×2 pixel matrix, i.e., it is also required to use various combinations of, for example, horizontal paddings or vertical paddings to obtain the padded pixel data (or referred to as pixel block). FIG. 2 illustrates a schematic diagram of a traditional pixel block having different padding settings applicable to the weight gradient calculation.

To facilitate understanding on FIG. 2, the concepts of tiling and pixel block (also referred to as tile) used in the tiling process are first introduced briefly. Tiling is a common technique for data processing. Performing a tiling processing indicates processing a certain amount of pixel data. For example, when image processing is performed, hardware can process pixel data of 64 pixels of a pixel block.

As shown in FIG. 2, the original pixel data 210 can be a pixel block (also referred to as tile), including an 8×8 pixel matrix. During padding, a pixel block of original pixel data 210 having a certain padding setting (+x, +y) is obtained by translating by x in the horizontal direction and by y in the vertical direction using the location of the original pixel data 210 as an origin.

For example, as shown in FIG. 2, the pixel block 220 of the original pixel data 210 having a padding setting (+1, +1) is an 8×8 pixel block having such padding setting obtained by translating leftwards by 1 in the horizontal direction and upwards by 1 in the vertical direction using the location of the original pixel data 210 as the origin. In other words, during weight gradient calculation, for the original pixel data 210, it is pixel data included in a pixel block (e.g., pixel block 220) of the original image (e.g., pixel block 210) having a certain padding setting that actually needs to be acquired. As such, in order to acquire pixel data in the pixel block 220, it is required to acquire not only some pixel data (i.e., data in the part of the pixel block 210 overlapping the pixel block 220 in FIG. 2) from the original pixel data 210 but also some pixel data from a location beside the original pixel data 210, i.e., some pixel data in the upper line and the left column of the original pixel data 210.

In a further example, the pixel block 230 of the original pixel data 210 having the padding setting (−1, −1) is an 8×8 pixel block having such setting obtained by translating rightwards by 1 (i.e. translating leftwards by −1) in the horizontal direction and downwards by 1 in the vertical direction using the location of the original pixel data 210 as the origin. In other words, during weight gradient calculation, for the original pixel data 210, it is pixel data included in a pixel block (e.g., pixel block 210) having a certain padding setting of the original image (e.g., pixel block 210) that actually needs to be acquired. As such, in order to acquire pixel data in the pixel block 220, it is required to acquire not only some pixel data (i.e., data in the part of the pixel block 210 overlapping the pixel block 230 in FIG. 2) from the original pixel data 210 but also some pixel data from a location beside the original pixel data 210, i.e., some pixel data in the lower line and the right column of the original pixel data 210.

The inventor of the present disclosure has realized that, when pixel blocks having different padding settings are to be acquired from the buffer, as shown in FIG. 2, it is required to read/load those pixel blocks (e.g., pixel blocks 220 and 230) having different padding settings from the cache, respectively. However, some pixel data may be read redundantly, incurring a resource waste during reading.

In an example, as shown in FIG. 2, the pixel blocks 220 and 230 include partially overlapping pixel data. In a further example, the 2×2 pixel 120, the 2×2 pixel 126 and the 2×2 pixel 132 include overlapping pixel data. If those pixel blocks are loaded respectively, it may cause a waste in system resource.

In order to solve at least partly solve the above-mentioned problems, the embodiments of the present disclosure provide a method for computing. In the solution of the present disclosure, a pixel block set is first determined, where a first pixel block in the pixel block set includes an m×n pixel matrix having a first padding setting related to original pixel data, where m and n are positive integers. Then, the pixel block set is stored in the buffer (e.g., a target buffer) such that a second pixel block can be read from the buffer based on the buffer initial address of the first pixel block and an address offset associated with the second pixel block, where the second pixel block has a second padding setting related to the original pixel data, and the first padding setting and the second padding setting have the same offset amount in a first direction relative to the original pixel data. In this way, the solution of the present disclosure can decreases the counts of loading the redundant pixel data included in the padded pixel block, thereby reducing the system power consumption and improving the system performance.

Figure 3:
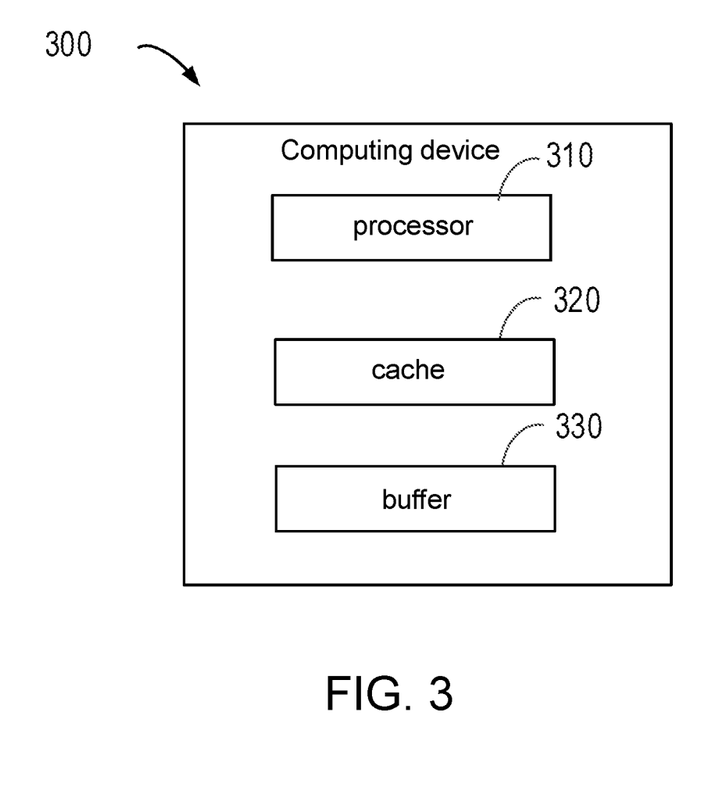
FIG. 3 illustrates a schematic diagram of a computing device where a plurality of embodiments of the present disclosure can be implemented.
Figure 4:
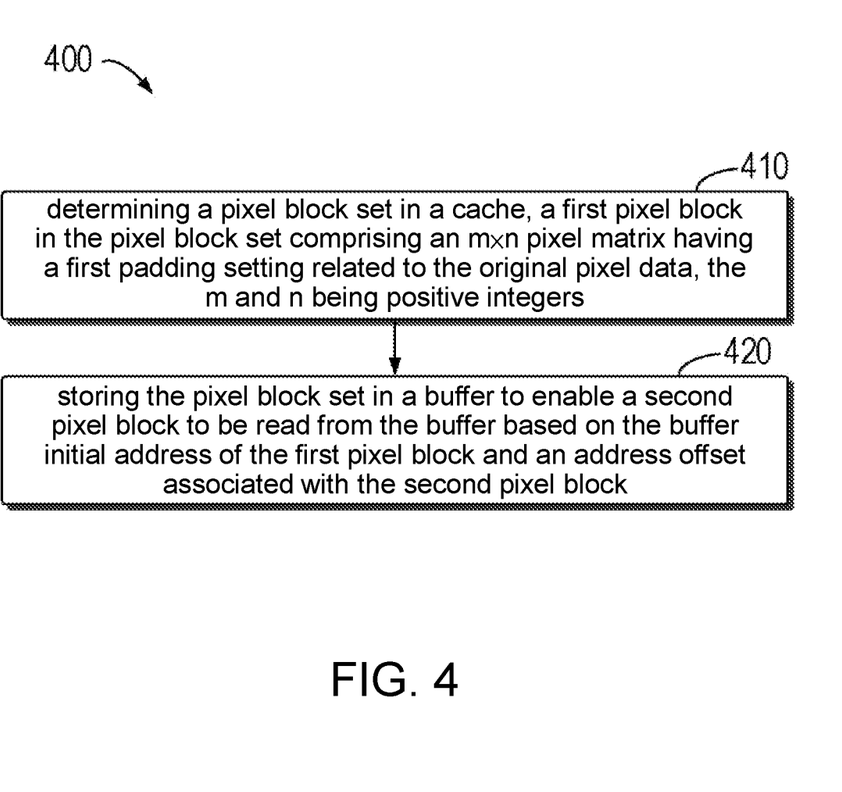
FIG. 4 illustrates a flowchart of a method for computing according to embodiments of the present disclosure.
Figure 5:
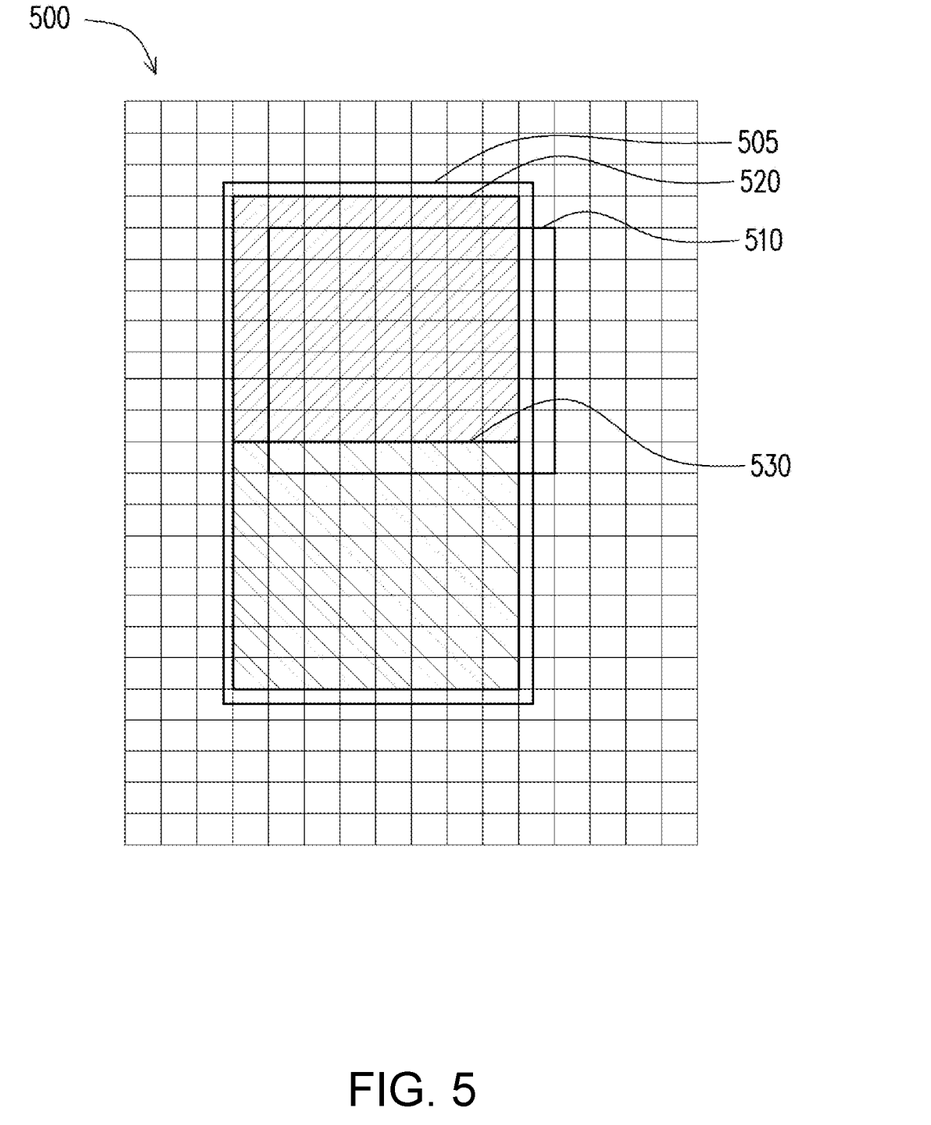
FIG. 5 illustrates a schematic diagram of loading a pixel block set according to some embodiments of the present disclosure.

Reference now will be made to FIGS. 3-5 to describe the implementations of the present disclosure.

FIG. 3 illustrates a schematic diagram of a computing device 300 where a plurality of embodiments of the present disclosure can be implemented. As shown therein, the computing device 300 at least includes a processor 310, a cache 320 and a buffer 330. In an example, the computing device 300, for example, may be applied to a chip. In a further example, the computing device 300 may be applied to neural network computation accelerated by a Graphics Processing Unit (GPU). Alternatively, the computing device 300 may be used in a vector processor, other types of data computing units, or other computing units for artificial intelligence.

The processor 310 is used to process a pixel block loaded from the cache 320. In an embodiment, the processor 310 may be a General Matrix Multiplication Unit (GEMM). In other embodiments, the processor 310 may be other type of processor, and the scope of the present disclosure is not limited in the aspect.

The cache 320 is used to cache data. In an example, the cache 320 can cache an original image or original pixel data for convolution. In an example, the cache 320 may include a plurality of cache lines, where each cache line may include a virtual address such that the processor 310 can use the virtual address to load data from the cache line.

The buffer 330 can be used to store data, for example, a pixel block that may be constituted by original pixel data, or pixel data having a certain padding setting. For example, the processor 310 in the computing device 300 can read/load one or more pixel blocks from the cache 320 and store the one or more pixel blocks in the buffer 330, to enable the processor 310 to process the pixel blocks.

Hereinafter, the method for computing according to embodiments of the present disclosure will be described with reference to FIG. 3 and in combination with FIGS. 4 and 5. FIG. 4 illustrates a flowchart of a method for computing according to embodiments of the present disclosure. It would be appreciated that the method may involve addition components and actions not shown and/or may skip over components and actions shown therein, and the scope of the present disclosure is not limited in the aspect. FIG. 5 illustrates a schematic diagram of loading a pixel block set. It would be appreciated that FIG. 5 is merely a schematic diagram of an example of loading a pixel block set according to an embodiment of the present disclosure. Although FIG. 5 only illustrates loading a pixel block set including two pixel blocks, it would be appreciated that the pixel block set may include any number of pixel blocks, and the protection scope of the present disclosure is not limited in the aspect.

As shown in FIG. 4, at step 410, the computing device 300 determines a pixel block set in the cache 320. The pixel blocks in the pixel block set include an m×n pixel matrix having a first padding setting related to the original pixel data, where m and n are positive integers. In an example, m and n may be 8. It would be appreciated that m and n may be other positive integers, and the scope of the present disclosure is not limited in the aspect.

Reference now will be made to FIG. 5 to describe step 410 of FIG. 4 in detail. In some embodiments, as shown in FIG. 5, the computing device 300, for example, determines a pixel block set 505 in the cache 320, which is comprised of an 8×16 pixel matrix. For example, the pixel block set 505 may include a pixel block 520 and a pixel block 530. The pixel block 520 includes an 8×8 pixel matrix having a first padding setting related to the original pixel data 510, where the first padding setting is (+1, +1). In other words, the pixel block 520 is an 8×8 pixel matrix formed by translating leftwards by 1 in the horizontal direction and upwards by 1 in the vertical direction using the location of the original pixel data 510 as the origin. Optionally, it may be interpreted as that the pixel block 520 is an 8×8 pixel matrix formed in such a manner of translating leftwards by 1 in the horizontal direction and then upwards by 1 in the vertical direction using the pixel at the upper left corner from the 64 pixels in the 8×8 pixel matrix of the original pixel data 510 as the origin, and then using the location as the origin of the upper left corner of the matrix, as shown in FIG. 5. Moreover, in an example, the pixel block 530 includes two 8×8 pixel matrices adjacent to the pixel block 510 in the vertical direction, as shown in FIG. 5.

In some embodiments, the first +1 in the first padding setting (+1, +1), as mentioned above, indicates translation by a distance of 1 in the horizontal direction with the original pixel data 510 as the origin (i.e., it is a pixel data point, or called one pixel, namely a pixel in 64 pixel data points in the 8×8 original pixel data 510). Likewise, the second +1 in the first padding setting (+1, +1) represents translation by a distance of 1 in the vertical direction with the original pixel data 510 as the origin.

In some other embodiments, since padding is required after the translation, the padded data may be data around the original pixel data 510, which are comprised of 8×8 pixel matrices. For example, if the data to be processed is an image, the image may include a plurality of original pixel data 510, and the original pixel data 510 constituting the image may be consecutively stored in the cache 320 (e.g., the data may be stored in different cache lines or the same cache line of the cache 320). In this way, the padded data will be the pixel data around the original pixel data 510 of the image. In some examples, when the original pixel data 510 to be processed are pixel data at the boundary of the image (not shown in FIG. 5), there will be no data that can be used for padding the surroundings of the original pixel data 510. In the case, the padded pixel data can be acquired in a manner of padding value zero.

In some embodiments, the first padding setting can be determined based on a filter size. For instance, in the example as shown in FIG. 5, the filter size may be 3×3. In other words, when the filter size is 3×3, the first padding setting may be (+1, +1). In some other examples, when the filter size is 5×5, the first padding setting may be (+2, +2). Alternatively, when the filter size is 7×7, the first padding setting may be (+3, +3). The filter may be of other sizes, and the protection scope of the present disclosure is not limited in the aspect.

Figure 6:
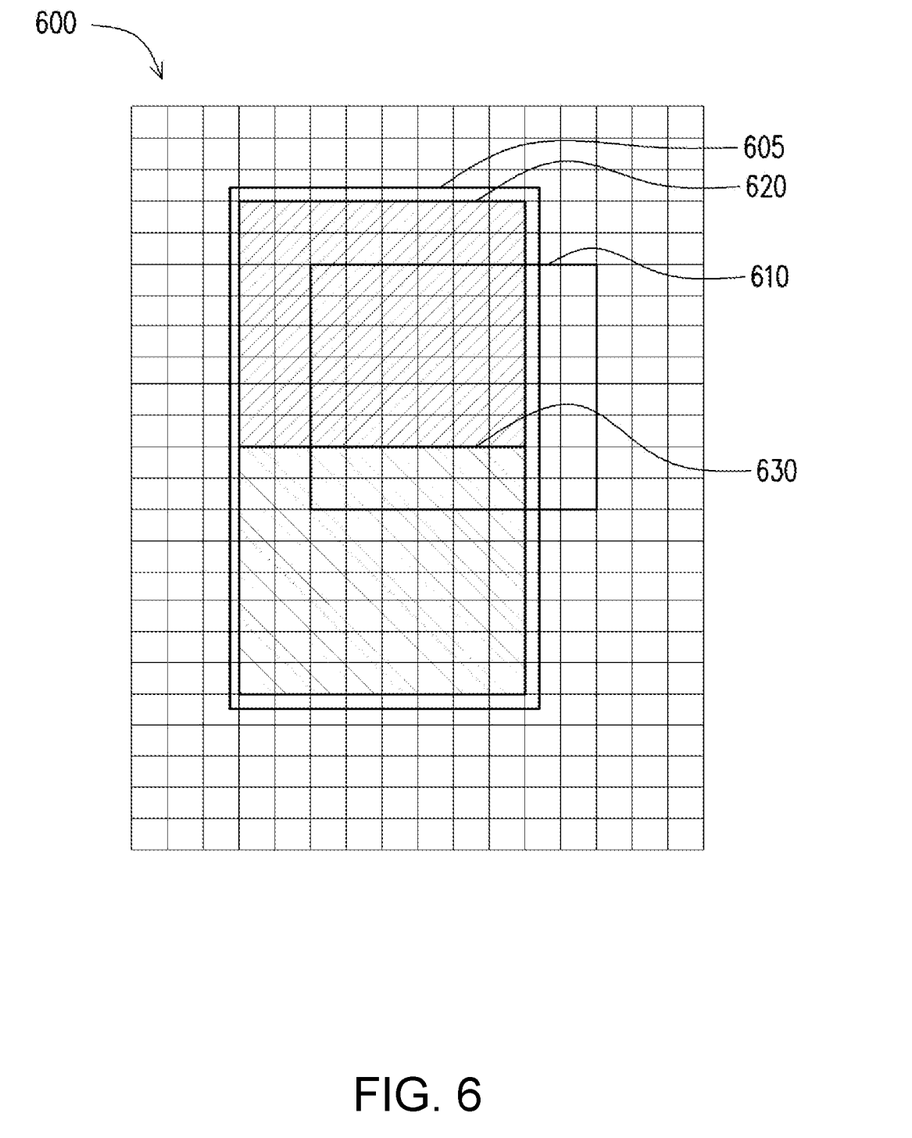
FIG. 6 illustrates a schematic diagram of loading a pixel block set according to some other embodiments of the present disclosure.

FIG. 6 is a schematic diagram of loading a pixel block set according to some other embodiments of the present disclosure. It would be appreciated that FIG. 6 is merely a schematic diagram of an example of loading a pixel block set according to an embodiment of the present disclosure. Although FIG. 6 only illustrates loading a pixel block set including two pixel blocks, it would be appreciated that the pixel block set may include any number of pixel blocks, and the scope of the present disclosure is not limited in the aspect.

As shown in FIG. 6, when the filter size is 5×5, the computing device 300 determines, for example, in the cache 320, a pixel block set 605 which is comprised of 8×16 pixel matrices. For example, the pixel block set 605 may include a pixel block 620 and a pixel block 630. The pixel block 620 includes an 8×8 pixel matrix with a first padding setting related to the original pixel data 610, where the first padding setting is (+2, +2). In other words, the pixel block 620 is an 8×8 pixel matrix formed after translating leftwards by 2 in the horizontal direction and then translating upwards by 2 in the vertical direction using the location of the original pixel data 610 as the origin. As shown in FIG. 6, the pixel block 630 include two 8×8 pixel matrices adjacent to the pixel block 620 in the vertical direction.

Now, reference will be made back to FIGS. 4 and 5 to introduce some embodiments of the present disclosure. At step 420, the computing device 300 stores the determined pixel block set in the buffer 330, so as to read the second pixel block from the buffer 330 based on the initial address of the buffer 330 of the pixel block 520 and the address offset associated with the second pixel block.

The second pixel block at step 420 has a second padding related to the original pixel data 510. For example, the second padding setting may be (+1, +1), (+1, 0) or (+1, −1). In other words, the second padding setting may be identical to or different than the first padding setting.

In addition, the first padding setting of the pixel block 520 in the pixel block set 505 and the second padding setting have the same offset amount in a direction relative to the original pixel data 510. In some embodiments, when the first padding setting is (+1, +1), the second padding setting may be (+1, +1), (+1, 0) or (+1, −1) correspondingly. As such, the first padding setting and the second padding setting have the same offset amount in the horizontal direction, i.e., the offset amounts thereof in the horizontal direction are both +1.

It would be appreciated that the translating distance in the horizontal direction may be of other values, and the protection scope of the present disclosure is not limited in the aspect. For example, when the first padding setting is (0, +1), the second padding setting may be (0, +1), (0, 0) or (0, −1) correspondingly. Therefore, the first padding setting and the second padding setting have the same offset amount in the horizontal direction, i.e., the offset amounts thereof in the horizontal direction are both 0.

In some other embodiments, when the filter size is 5×5, the first padding setting of the pixel block 620 in the pixel block set 605 and the second padding setting have the same offset amount in the same direction relative to the original pixel data 610. In some embodiments, when the first padding setting is (+2, +2), the second padding setting may be (+2, +2), (+2, +1), (+2, 0), (+2, −1) or (+2, −2) correspondingly. In this way, when the filter size is 5×5, the first padding setting and the second padding setting have the same offset amount in the horizontal direction, i.e., the offset amounts thereof in the horizontal direction are both +2. It would be appreciated that the translating distance in the horizontal direction may be of other values according to the different filter size, and the protection scope of the present disclosure is not limited in the aspect.

In some embodiments, pixel data in a line from the pixel data in eight lines or pixel data in a column from the pixel data in eight columns of the pixel block 520 occupy an entry of the buffer 330. In an example, when a line in the pixel block includes 8 pixels, data of 8 pixels are stored in the entry of the buffer 330. In a further example, when a pixel may have p channels and a line of the pixel block include 8 of the pixels, for example, data in 8 lines×64 channels are stored in an entry of the target buffer 330. In other words, the pixel data in 8 lines×64 channels occupy an entry of the target buffer 330.

In some embodiments, a pixel bock occupies 8 such consecutive entries; and two pixel blocks, for example, constituting a pixel block set occupy 16 consecutive entries. Each entry has an address of the respective buffer 330. Therefore, in order to read, for example, a pixel bock with a padding setting (+1, −1), the computing device 300 may read +2 the initial address (i.e., the address of the initial entry) of the buffer 330 of the pixel block 520 as the initial address of the buffer 330. Hereinafter, some embodiments will be described in detail.

In some embodiments, when the second padding setting is (+1, +1), the respective second pixel block is an 8×8 pixel matrix acquired after translating leftwards by a unit (or referred to as one pixel data) and then translating upwards by a unit using the respective second pixel block as the original pixel data 510. In this way, since the pixel blocks 520 and 530 read at step 410 from the cache 320 to the buffer 330, the second pixel block can be read from the buffer 330 of the pixel block 520 based on the initial address of the buffer 330 and the address offset (i.e., offset 0) associated with the second pixel block (i.e. the 8×8 pixel matrix obtained after translating the original pixel data 510 leftwards by a unit and then upwards by a unit), i.e., the second pixel block is constituted by pixel data in 8 lines read from the first line of pixel data of the pixel block 520. In other words, in order to read the second pixel block with a padding setting (+1, +1) of the original pixel data 510, the computing device 300 can read consecutively pixel data in 8 lines, i.e., pixel data in 8 consecutive entries, using the initial address of the buffer 330 of the pixel block 520 as the initial address of the buffer 330.

In some other embodiments, when the second padding setting is (+1, 0), the respective second pixel block is an 8×8 pixel matrix obtained after translating the original pixel data 510 leftwards by a unit. In the case, since the pixel blocks 520 and 530 are read at step 410 from the cache 320 to the buffer 330, the second pixel block (i.e., the second pixel block having the second padding setting (+1, 0)) can be read from the buffer 330 based on the initial address of the buffer 330 of the pixel block 520 and the address offset (i.e., offset +1) associated with the second pixel block (i.e. the 8×8 pixel matrix obtained after translating the original pixel data 510 leftwards by a unit), i.e., the second pixel block is constituted by pixel data in 8 lines read from the second line of pixel data of the pixel block 520. In other words, in order to read the second pixel block with a padding setting (+1, 0), the computing device 300 can read consecutively pixel data in 8 lines, i.e., pixel data in 8 consecutive entries, using +1 the initial address of the buffer 330 of the pixel block 520 as the initial address of the buffer 330.

Likewise, when the second padding is (+1, −1), the respective second pixel data is an 8×8 pixel matrix obtained after translating the original pixel data 510 leftwards by a unit and then downwards by a unit. As such, based on the initial address of the buffer 330 of the pixel block 520 and the address offset (i.e., offset 2) associated with the second pixel block (i.e. the 8×8 pixel matrix obtained after translating the original pixel data 510 leftwards by a unit and downwards by a unit), the second pixel block can be read from the buffer 330, i.e., the second pixel block is constituted by pixel data in 8 lines read from the third line of pixel data of the pixel block 520. In other words, in order to read the pixel block with a padding setting (+1, −1), the computing device 300 can read consecutively pixel data in 8 lines, i.e., pixel data in 8 consecutive entries using +2 the initial address of the buffer 330 of the pixel block 520 as the initial address of the buffer 330.

Only after reading one pixel block set (e.g. the pixel block set 505 including pixel blocks 520 and 530) from the cache 320 to the buffer 330, pixel blocks of original pixel data (e.g., original image data 510) having 3 or more padding settings can be obtained. In this way, it can avoid reading the redundant pixel data from the cache 320, thereby decreasing counts of reading, reducing the system power consumption and improving the system performance.

In addition, in some embodiments, when the filter size is 3×3, there may be 9 different second padding settings, namely (+1, +1), (+1, 0), (+1, −1), (0, +1), (0, 0), (0, −1), (−1, +1), (−1, 0) and (−1, −1) correspondingly. Thus, before convolution calculation, in order to acquire the pixel blocks having the above-mentioned 9 different padding settings, three respective pixel blocks can be read from the cache 320 to the buffer 330 to implement the processing the pixel blocks having the 9 different padding settings, and it is not required any more to read, for the 9 padding settings, 9 pixel blocks from the cache 320. In this way, it can avoid reading redundant pixel data from the cache 320, thereby decreasing counts of reading, reducing the system power consumption and improving the system performance.

As described above, in some embodiments, when the filter size is 5×5, the first padding setting may be (+2, +2). Correspondingly, the second padding setting may be: (+2, +2), (+2, +1), (+2, 0), (+2, −1) or (+2, −2). In order to read the pixel block having the padding setting (+2, +2), the computing device 300 can read using the initial address of the buffer 330 of the pixel block having the first padding setting as the initial address of the buffer 330; in order to read the pixel block having the padding setting (+2, +1), the computing device 300 can read using +1 the initial address of the buffer 330 of the pixel block having the first padding setting as the initial address of the buffer 330; in order to read the pixel block having the padding setting (+2, 0), the computing device 300 can read using +2 initial address of the buffer 330 of the pixel block having the first padding setting as the initial address of the buffer 330; in order to read the pixel block having the padding setting (+2, −1), the computing device 300 can read using +3 initial address of the buffer 330 of the pixel block having the first padding setting as the initial address of the buffer 330; in order to read the pixel block having the padding setting (+2, −2), the computing device 300 can read using +4 initial address of the buffer 330 of the pixel block having the first padding setting as the initial address of the buffer 330.

After reading one pixel block set (e.g. the pixel block set 605 including pixel blocks 620 and 630) from the cache 320 to the buffer 330, pixel blocks of original pixel data (e.g., original image data 610) having 5 padding settings can be obtained from the buffer 330. As such, it can avoid reading redundant pixel data from the cache 320 while reducing the system power consumption and improving the system performance.

It would be appreciated that although the above has described that the first padding setting and the second padding setting have the same offset amount in the horizontal direction relative to the original pixel data, the first padding setting and the second padding setting may also have the same offset amount in the vertical direction relative to the original pixel data according to some other embodiments. The protection scope of the present disclosure is not limited in the aspect.

In an example, when the first padding setting is (+1, +1), the second padding setting may be (+1, +1), (0, +1) or (−1, +1) correspondingly. In the circumstance, the first padding setting and the second padding setting have the same offset amount, i.e., they are both offset upwards by +1 in the vertical direction. Therefore, the first padding setting and the second padding setting of the respective pixel blocks in the pixel block set have the same offset amount in the vertical direction relative to the original pixel data. In some other examples, the offset amount may be of other values in the vertical direction, and the protection scope of the present disclosure is not limited in the aspect.

As such, when reading only one pixel block set from the cache 320 to the buffer 330, the pixel block set, for example, may include a pixel block 520 as shown in FIG. 5 and a further 8×8 pixel block (not shown) adjacent to the pixel block 520 in the horizontal direction. After the pixel block set is read to the buffer 330, a second pixel block having 3 different padding settings (i.e., (+1, +1), (0, +1) and (−1, +1)) related to the original pixel data (e.g., the original image data 510) from the buffer 310 can be acquired from the buffer 330. In this way, it can avoid reading redundant pixel data from the cache 320, thereby reducing the system power consumption and improving the system performance.

It would be appreciated that the method 400 can be implemented as a computer software program that is tangibly included in a machine readable medium, e.g., the storage unit. In some embodiments, part or all of the computer programs may be loaded and/or mounted onto the computing device 300 via read-only memory (ROM) and/or communication unit. When the computer program is loaded to the random access memory (RAM) and executed by the central processing unit (CPU), one or more steps of the method 400 as described above may be executed.

The present disclosure may relate to a method, device, system, and/or computer program product. The computer program product may include a computer readable storage medium having computer readable program instructions thereon for carrying out aspects of the present disclosure. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that steps may be performed in the sequences as describe above, re-ordered, added or deleted. For example, the respective steps as recited in the present disclosure can be performed in parallel or sequentially, or may be performed in a different order as long as desired outcome of the technical solution as disclosed can be achieved, which is not limited herein.

The above specific implementations do not constitute a limitation to the protection scope of the present disclosure. Those skilled in the art would appreciate that various modifications, combinations, sub-combinations and substitutions are allowed according to the design needs and other facts. The present disclosure is intended to cover any modifications, equivalents and improvements included in the spirit and scope of the appended claims.

What is claimed is:

1. A method for computing, comprising:
   determining a first pixel block and a second pixel block in a pixel block set in a cache based on an m×n original pixel matrix of original pixel data, wherein the first pixel block comprises an m×n first pixel matrix having a first padding setting related to original pixel data, the m and n are positive integers, and the second pixel block comprises an m×n second pixel matrix having a second padding setting related to the original pixel data; and
   storing the pixel block set in a buffer to enable the second pixel block to be read from the buffer based on a first initial address of the first pixel block in the buffer and the second padding setting,
   wherein the first padding setting includes a first offset amount and a second offset amount relative to the original pixel data in a first direction and a second direction, respectively; the second padding setting includes a third offset amount and a fourth offset amount relative to the original pixel data in the first direction and the second direction, respectively; the first offset amount and the third offset amount in the first direction relative to the original pixel data are the same,
   the first pixel matrix is formed by translating the first offset amount in the first direction and translating the second offset amount in the second direction using a location of the original pixel data as an origin;
   the second pixel matrix is formed by translating the third offset amount in the first direction and translating the fourth offset amount in the second direction using the location of the original pixel data as an origin.

2. The method according to claim 1, wherein pixel data in a line from m lines or pixel data in a column from n columns occupy an entry of the buffer and the entry has a corresponding buffer address.

3. The method according to claim 1, wherein the pixel block set comprises 2 pixel blocks, and each pixel block comprises an 8×8 pixel matrix.

4. The method according to claim 1, wherein the first direction is a horizontal direction or vertical direction.

5. The method according to claim 1, wherein the second offset amount and the fourth offset amount in the second direction relative to the original pixel data are different.

6. The method according to claim 1, wherein when a filter size is 3×3 the original pixel data have 9 different padding settings including the first padding setting and the second padding setting, and the second offset amount and the fourth offset amount in the second direction relative to the original pixel data are different.

7. The method according to claim 1, wherein the original pixel data have multiple different padding settings, and reading the second pixel block from the buffer comprises:
   reading a plurality of second pixel blocks from the buffer, the plurality of second pixel blocks having respective padding settings, the respective padding settings having the same offset amount in the first direction relative to the original pixel data, the second offset amount and the fourth offset amount in the second direction relative to the original pixel data are different.

8. The method according to claim 1, further comprising:
   determining, based on a filter size related to the original pixel data, the first padding setting.

9. A computing device, comprising:
   at least one processing unit; and
   at least one memory coupled to the at least one processing unit and storing instructions executed by the at least one processing unit, the instructions causing, when executed by the at least one processing unit, the computing device to perform the method of claim 1.

10. The computing device according to claim 9, wherein the computing device comprises a vector processor.

11. The computing device according to claim 9, wherein the computing device is used for artificial intelligence.

12. A non-transitory computer readable storage medium storing computer instructions stored thereon, wherein the computer instructions executed by at least one processor to perform a process for computing, comprising:
   determining a first pixel block and a second pixel block in a pixel block set in a cache based on an m×n original pixel matrix of original pixel data, wherein the first pixel block comprises an m×n first pixel matrix having a first padding setting related to original pixel data, the m and n are positive integers, and the second pixel block comprises an m×n second pixel matrix having a second padding setting related to the original pixel data; and storing the pixel block set in a buffer to enable the second pixel block to be read from the buffer based on a first initial address of the first pixel block in the buffer and the second padding setting, wherein the first padding setting includes a first offset amount and a second offset amount relative to the original pixel data in a first direction and a second direction, respectively; the second padding setting includes a third offset amount and a fourth offset amount relative to the original pixel data in the first direction and the second direction, respectively; the first offset amount and the third offset amount in the first direction relative to the original pixel data are the same, the first pixel matrix is formed by translating the first offset amount in the first direction and translating the second offset amount in the second direction using a location of the original pixel data as an origin;

the second pixel matrix is formed by translating the third offset amount in the first direction and translating the fourth offset amount in the second direction using the location of the original pixel data as an origin.

* * * * *